Nov. 8, 1949

N. H. IVERSEN 2,487,757

BROACH WITH INTEGRAL GUIDING ELEMENTS

Filed Feb. 28, 1947

INVENTOR
*Norman H. Iversen*
BY
*Evans & McCoy*
ATTORNEYS

Patented Nov. 8, 1949

2,487,757

UNITED STATES PATENT OFFICE 2,487,757

BROACH WITH INTEGRAL GUIDING ELEMENTS

Norman H. Iversen, Birmingham, Mich., assignor to The Production Broaching Corporation, Detroit, Mich., a corporation of Delaware Application February 28, 1947, Serial No. 731,452

2 Claims. (Cl. 29—95.1)

This invention relates to bar broaches for internal broaching, and more particularly to broaches of the type having guide members interposed between cutting teeth to prevent drifting.

Due to their weight, internal broaches have a tendency to drift away from the desired line of travel while they are being pushed or pulled through the work, and this tendency may be increased by unequal sharpness of cutting teeth. In order to prevent such drifting, it has heretofore been common practice to provide guiding members in the form of teeth or buttons which are interposed between longitudinally spaced teeth and have the same external diameter as the adjacent cutting teeth. Such guide members have been provided with straight lands or rounded edges for engagement with the work. In order to enable the cutting teeth to cut effectively they are provided with peripheral faces that taper away from the cutting edges to provide a clearance angle. When such teeth are sharpened by grinding back their front faces, they are reduced in diameter and, with guide members such as heretofore provided, it has been necessary to subject the entire broach to a cylindrical grinding operation in order to bring the guide members and cutting teeth to the same external diameter. Broaches have a tendency to warp in service due to the stresses imposed thereon during the cutting operations, and this tendency is more marked in broaches of small diameter. Reducing the guide teeth or buttons to the proper external diameter by a cylindrical grinding operation becomes extremely difficult when the broach is not straight, and for this reason it has often been necessary to discard a broach after a very few sharpenings.

The present invention has for its objects to provide a broach having guide members to prevent drifts which are such form that the machining operations incident to sharpening are greatly simplified, and to provide a broach which has longer life since it can be more easily rendered serviceable when slightly warped.

With the above and other objects in view, the invention may be said to comprise the broach as illustrated in the acompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
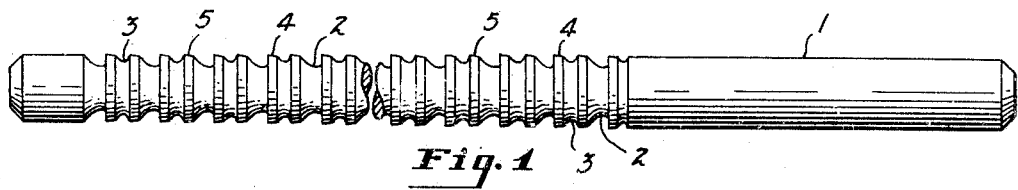
Figure 1 is a side elevation of a broach embodying the invention.

In the accompanying drawings a broach is shown in the form of an elongated bar 1 provided with spaced circumferential grooves 2 and 3 which are interposed between cutting teeth 4 and guide teeth 5. The guide teeth 5 are positioned between the longitudinally spaced cutting teeth 4. The cutting teeth 4 are provided with peripheral faces 6 that taper rearwardly from the front edges of the teeth to provide an external clearance angle, and the guide teeth 5 are provided with similar peripheral faces 7 that are tapered at the same angle.

Figure 2:
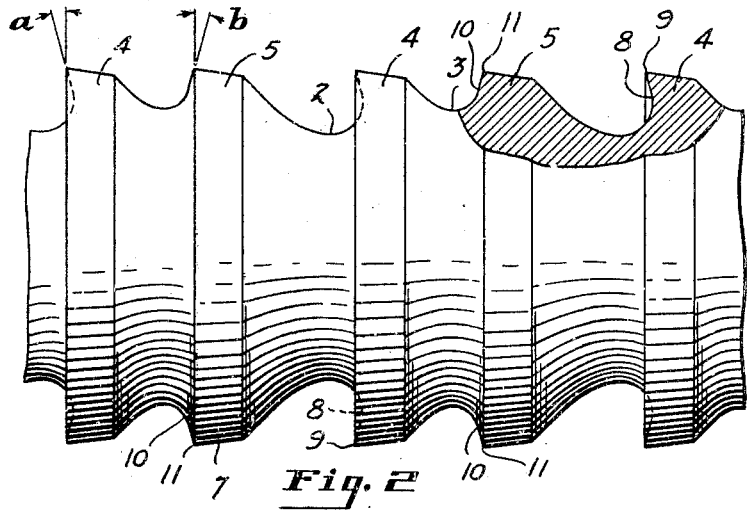
Fig. 2 is a fragmentary side elevation on an enlarged scale, with a portion broken away to show one cutting tooth and one guide tooth in axial section.

The cutting teeth 4 have front faces 8 which are disposed at an angle to the axis of the broach such as to provide positive front rake. The angle of rake is indicated at $a$ in Fig. 2, and since the faces 8 are reentrantly disposed with respect to the teeth 4, the front faces 8 are disposed at an acute angle to the peripheral faces 6 so as to provide acute angled cutting edges 9.

The guide teeth 5 have front faces 10 which are inclined at an angle $b$ to planes perpendicular to the axis of the broaches, the inclination being opposite that of the front faces 8 of the cutting teeth so as to provide the guide teeth with negative front rake. The negative rake angle $b$ is preferably greater than the clearance angle of the peripheral faces 7 so that the front faces 10 intersect the peripheral faces 7 of the guide teeth 5 at an obtuse angle. The broach has the usual slight longitudinal taper and the peripheral edges of the cutting teeth and guiding teeth are in longitudinal alinement. When the broach is round in cross section, the arcuate front edges of both the cutting teeth and the guiding teeth lie substantially in the same surface of revolution which is a cone of very slight taper. The obtuse angled edges of the guide teeth 5 slide on the surfaces cut by the cutting edges 9 and serve to prevent drifting of the broach.

Figure 3:
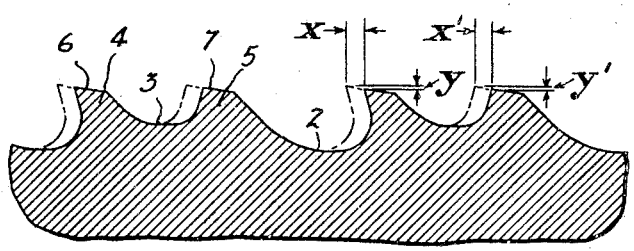
Fig. 3 is a fragmentary sectional view showing how the front faces of the cutter teeth and guide teeth are ground back to maintain proper alinement.

Fig. 3 of the drawing shows cutting teeth 4 which have been sharpened by grinding away a portion of the front face thereof as indicated by the lines X, reducing the diameter of the cutting edges by an amount indicated by the spaced lines Y. After the cutting teeth have been ground, the front faces of the guide teeth 5 may be ground back as indicated by the spaced lines X' to reduce their diameter by an amount indicated by the spaced lines Y'. The guide teeth may be ground by means of the same wheel employed to grind the cutter teeth by simply adjusting the angle of the wheel, and if the depth of the material removed from the front face of the guide teeth indicated by the lines X' is equal to the depth of the material removed from the front face of the cutter teeth indicated at X, the reduction in Y' in diameter of the guide teeth will equal the reduction Y in the diameter of the cutter teeth.

A slight warping of the broach will not seriously affect the accuracy of the tooth grinding operation and a broach may be rendered serviceable by sharpening even though it may be warped to an extent such that it would be impracticable to attempt to bring the teeth to size by means of a cylindrical grinding operation.

It is to be understood that variations and modifications of the specific devices herein shown and described for purposes of illustration, may be made without departing from the spirit of the invention.

What I claim is:

1. A broach provided with longitudinally spaced cutting teeth having longitudinally alined peripheral cutting edges, said teeth having front and peripheral faces so inclined to the broach axis as to provide positive front rake and an external clearance angle, and guide teeth intermediate said cutting teeth and having peripheral front edges in longitudinal alinement with said cutting edges, each guide tooth having a front face inclined to provide negative rake and a peripheral face inclined to substantially the same clearance angle as the peripheral faces of adjacent cutting teeth so that the cutting teeth and guiding teeth are equally reduced in diameter by an equal grinding back of the front faces.

2. A broach provided with longitudinally spaced cutting teeth having front and peripheral faces disposed to form acute angled cutting edges lying substantially in a slightly tapered surface of revolution, said front and peripheral faces providing positive front rake and an external clearance angle; and guide teeth having front and peripheral faces providing obtuse angled front edges lying substantially in the same surface of revolution as said cutting edges, said front and peripheral faces of each guide tooth providing a negative front rake and a clearance angle substantially the same as adjacent cutting teeth.

NORMAN H. IVERSEN.

REFERENCES CITED

The following references are of record in the file of this patent:

UNITED STATES PATENTS

| Number | Name | Date |
|---|---|---|
| 2,256,573 | Phaneuf | Sept. 23, 1941 |

FOREIGN PATENTS

| Number | Country | Date |
|---|---|---|
| 66,183 | Sweden | Jan. 28, 1926 |